United States Patent [19]

Johnson et al.

[11] 4,360,860

[45] Nov. 23, 1982

[54] SELF-CONTAINED HAND HELD PORTABLE LANTERN-FLASHLIGHT CONSISTING OF A MANUALLY OPERATED GENERATOR AND RECHARGEABLE BATTERIES

[76] Inventors: Hugh G. Johnson, Ridge Rd., Laurel Hollow, Syosset, N.Y. 11791; Burton C. Trattner, 160 Cedar St., Hempstead, N.Y. 11550

[21] Appl. No.: 93,777

[22] Filed: Nov. 13, 1979

Related U.S. Application Data

[63] Continuation of Ser. No. 775,149, Mar. 7, 1977, abandoned, which is a continuation-in-part of Ser. No. 769,137, Feb. 15, 1977, abandoned, which is a continuation of Ser. No. 553,954, Feb. 28, 1975, abandoned.

[51] Int. Cl.[3] .............. B60Q 1/00

[52] U.S. Cl. .............. 362/192; 362/183; 362/193; 320/2; 322/38

[58] Field of Search .............. 362/192, 193, 183; 320/2, 7, 35, 30; 322/383

[56] References Cited

U.S. PATENT DOCUMENTS

| | | | |
|---|---|---|---|
| 1,479,592 | 1/1924 | Evans | 362/192 |
| 2,299,762 | 10/1942 | McDermott | 322/30 X |
| 2,710,936 | 6/1955 | Lowry | 320/35 X |
| 3,156,813 | 11/1964 | Trainor | 219/202 X |
| 3,377,201 | 4/1968 | Wagner | 429/54 |
| 3,510,745 | 5/1970 | Futterer | 320/7 |
| 3,525,912 | 8/1970 | Wallin | 320/2 |
| 3,883,789 | 5/1975 | Achenbach | 320/2 |
| 3,973,179 | 8/1976 | Weber | 320/2 |
| 4,004,208 | 1/1977 | Tamminen | 320/7 |

OTHER PUBLICATIONS

Hayt, William H. and Kemmerly, Jack E., *Engineering Circuit Analysis,* 2d Edition, McGraw-Hill, 1971, p. 7.

*Primary Examiner*—Donald P. Walsh
*Attorney, Agent, or Firm*—Nolte and Nolte

[57] ABSTRACT

A unitary portable flashlight assembly incorporating a hand operated generator and rechargeable batteries, such as the pressure vented nickel-cadmium type with welded electrodes. The generator is designed and operated to charge th batteries at a high rate for a short time to provide extended operation of the load during a later discharging mode. The batteries also serve to regulate the voltage during the charging mode thus protecting the load if it be connected during the charging period. The battery assembly can provide the necessary energy to operate such devices as radio receivers and transmitters, electric fire starters, etc., as well as providing a mechanical output.

2 Claims, 13 Drawing Figures

FIG. 8
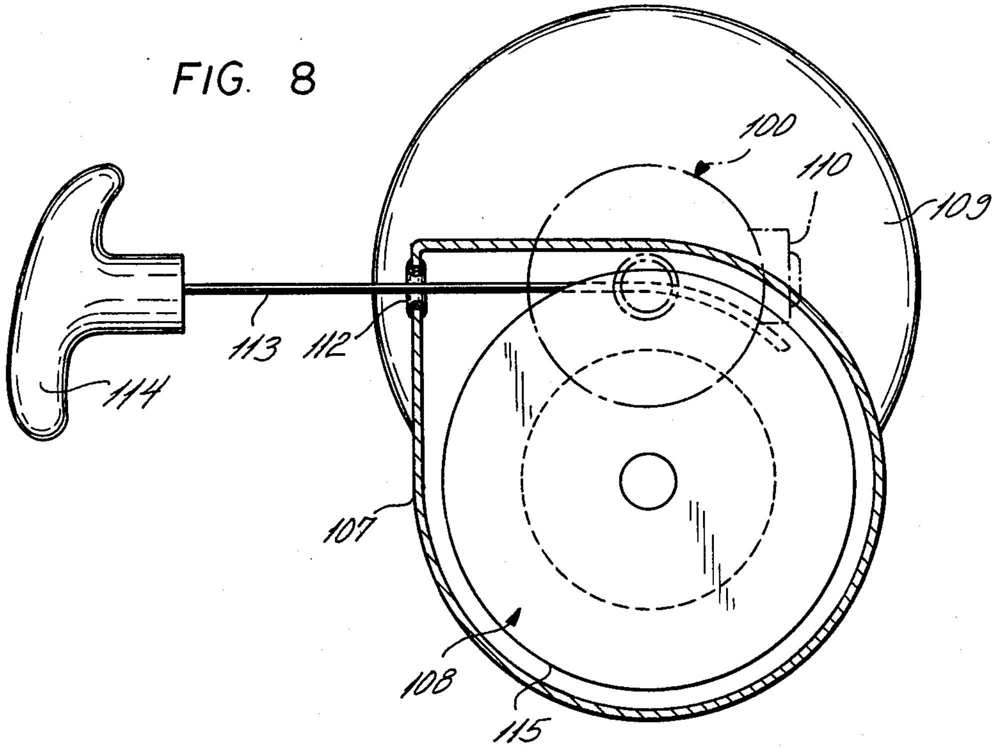
FIG. 9
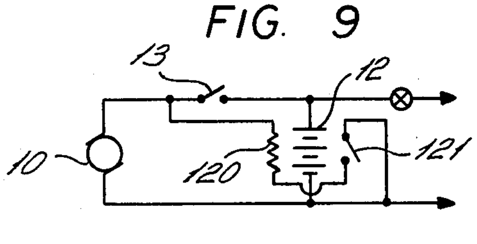
FIG. 11
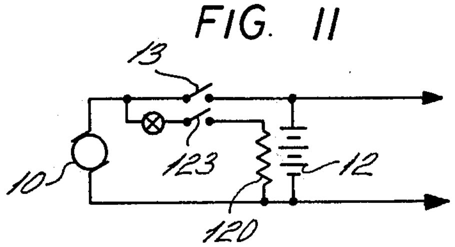
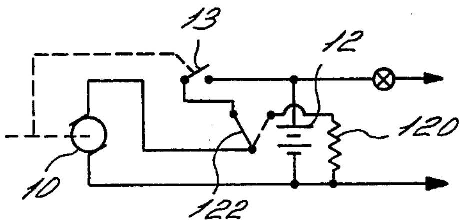
FIG. 10
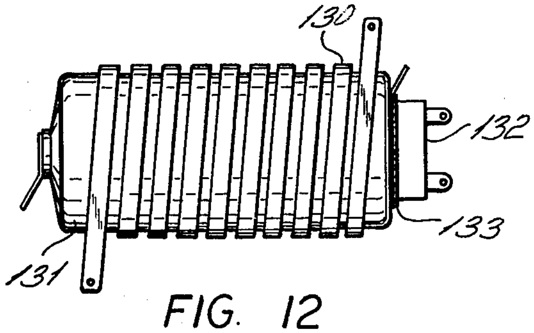
FIG. 12

SELF-CONTAINED HAND HELD PORTABLE LANTERN-FLASHLIGHT CONSISTING OF A MANUALLY OPERATED GENERATOR AND RECHARGEABLE BATTERIES

This application is a continuation of application Ser. No. 775,149 filed Mar. 7, 1977, which was a continuation-in-part of application Ser. No. 769,137 filed Feb. 15, 1977, which in turn was a continuation of application Ser. No. 553,954 filed Feb. 28, 1975 all abandoned.

BACKGROUND OF THE INVENTION

This invention relates generally to hand-held and manually operated flashlight assemblies, and is more particularly directed to flashlights and the like of the type having batteries which may be repeatedly recharged for extended use.

Presently, the most common flashlights are of the type using replaceable primary batteries, such as zinc-carbon, which are limited to a single discharge and typically have limited shelf life. Some flashlights are provided with batteries of the type especially adapted to being recharged, such as nickel-cadmium batteries. Some such units incorporate therein recharging units for the batteries, so that the unit may be plugged into a conventional wall outlet or other power source for recharging of the batteries. In other flashlights, auxiliary recharging devices are provided as separate units to enable recharging of the batteries in the flashlight from various sources of power. While such arrangements have definite usefulness, it is apparent that their operating time in field use is still limited to a single charge on the batteries and by self discharge characteristics, and hence they cannot be used for extended periods of time if separated from normal sources of power. In addition, unless constant care is taken on the part of an operator to maintain the charge on the batteries, the units may not be available for use in times of emergency.

Other flashlight units in the past have incorporated various forms of manually operated generators to enable the operator to use the device without prior charging, such devices having the advantage that they are continuously available for use whether in emergency situations or in the event extended operation remote from conventional power sources is necessary. Such flashlight assemblies have the disadvantage, however, that the constant operation becomes fatiguing and that there is no light available if operation is stopped more than momentarily, thus the use of hands for other manipulations is not possible. In addition, typical generator characteristics are not generally completely amenable to this form of operation, for example, due to variations in instantaneous output voltage which include high and low extremes that are detrimental to the lamp load's life and/or performance, and as a result many such units have been employed with additional structures such as fly wheels to attempt to stabilize the output voltages. Such expedients of course increase the complexity as well as the overall weight of the devices. In addition, the lamps are run in an undervoltage mode, with sacrifice to brightness and efficiency.

While stationary or vehicle carried lighting devices utilizing engines as the prime movers have been employed incorporating generators and rechargeable batteries connected to be charged by such generators, arrangements of this type are typically large and cumbersome, and even though such systems present many highly evolved specific functional advantages, such large engine driven systems are not adaptable to units such as flashlights that could be carried and handled by the average person. In addition, such devices are noisy and require fuel.

It is therefore an object of this invention to provide a unitary hand-held flashlight assembly device which includes a manually operable generator and rechargeable batteries and includes a load device such as an electric lamp, and which overcomes the above disadvantages of the previously employed devices.

Briefly stated, in accordance with the invention, a unitary hand-held flashlight device incorporates a manually operable generator, one or more rechargeable batteries, such as low impedance pressure vented batteries, such as nickel, and, as a typical useful end load, a flashlight lamp assembly.

The generator is connected to charge the battery, for example by way of a torque switch or speed switch or the like, so that the battery is not discharged by the generator windings at low speeds or standstill, the output voltage of the generator being greater at convenient cranking speeds than the battery terminal voltage. The battery serves as a storage device for the output of the generator, as well as acting as a voltage regulator, to permit use of the load, e.g., a flashlight, for extended time periods without operation of the generator. The load may be connected to the battery by any suitable switching device. The recommended nickel-cadmium battery offers additional advantages over other battery type lights, such as indefinite shelf life when stored in the discharge state.

The operating characteristics of rechargeable batteries, such as nickel-cadmium batteries, do not permit unlimited design possibilities with respect to the charging circuit. While such batteries may be rapidly charged with relatively high currents, such charging can only be done safely for a limited length of time and only to a portion of full capacity, this being dependent upon the cell construction, on the charge initially stored in the battery and on cell temperature, which is in turn dependent upon duty cycle and ambient temperature. If a fully charged battery is subsubjected to high charging rates, it may cause damage to the battery, as well as possible explosion in unvented cells, as a result of thermal and gassing effects. While it has been proposed that the charging rates, at least insofar as rapid charging rates are concerned, be controlled as a function of the cell temperature and/or voltage, such control techniques are difficult unless thermal sensing means are provided within the battery, since external sensing devices for controlling the charging do not accurately reflect the actual temperature within the battery in sufficient time to inhibit excessive charging. One technique for overcoming this problem is to dump the charge on the battery, so that the battery may be charged at a high rate for a predetermined period of time with safety. Such techniques, while satisfactory for some purposes, are not readily acceptable in flashlight units especially when intended for manual operation where the limit of input work endurance is critical. In this application it is preferable, practical and possible to use the dimming of the flashlight as an indicator of the state of discharge, suitable for accepting a fast charge without cell overcharge. In another technique for charging the batteries, a much lower charging rate is provided, for example 1/10th of the ampere hour capacity of the battery. While such a charging rate may in general safely be used on such batteries even though they are fully charged, the disadvantage arises that it takes an excessively long period of time, e.g., up to about 14 hours, to completely charge a discharged battery. While such low charging rates may be acceptable in some circumstances, such as when employing the rechargeable batteries in a seldom-used flashlight that can be charged by conventional power sources, such low charging rates would not normally be considered to be of value in a manually regenerated unit, since it would appear to be a great disadvantage to require such excessive periods of time in the manual recharging of the unit. Such considerations, which are apparent from cursory investigation of the characteristics of the batteries, in the past have led others to the conclusion, from the standpoint of prior concepts, that employing rechargeable batteries in a combined generator and flashlight assembly would not be either useful or practical, and consequently at this time assemblies of this type are not commercially available.

In order to overcome this problem, the present invention provides a generator capable of supplying output current at a rate to permit fast charging of the nickel-cadmium batteries, in order to overcome the undesirability of excessively long charging times. The duration and effort of the charging, however, is related to the energy that the average individual will be willing and able to expend in charging the batteries. In addition, it is desired to charge only to a fraction of the rated battery capacity to provide a safety margin. Thus, in the selection of a generator and the design of gearing between the generator and the manually operated turning device, the torque of the generator, the speed of rotation of the generator, the length of the crank arm, and the gear ratios are selected so that the average person will not under normal circumstances exceed a fraction of the capacity of the system and thereby damage the batteries, but is able to attain a useful ratio of energy input time to load operating time without reaching a fatigue limit.

For example, it has been found that, with a simple hand cranking mechanism, the average individual will not readily turn a small crank at a rate much greater than about 250 rpm, and the duration of the effort will normally not exceed one minute. Considering the relationship in a conventional d.c. generator, it is known that the voltage delivered by a generator is directly proportional to its speed, while the torque of a generator is proportional directly to the delivered current. The rotational speed of the drive for the generator can be varied, by varying the parameters, for example, of a gear train between the generator and the drive, to select the desired speed for the average individual in turning the charging handle, and the charging current is thus selected also on the basis of the capability of the average individual to charge the device, so that the torque at the driving handle which may be varied by changing the crank arm length is sufficiently great to cause fatigue without attaining an excessive charge on the battery, but yet the charge rate is sufficiently great that the energy produces useful current and is not substantially lost in frictional or other losses in the device. The batteries may then be selected on the basis of the current output of the generator when being charged by the average individual. It has been found, for example, that a successful charging current in this environment is about 5–20 times the rated capacity in ampere hours of the battery. Since the voltage and power output of a generator is a function of its speed, the size and number of cells employed in series in this charging circuit are selected on the basis of the charging current, as a function of torque, and the speed of the generator.

In a further embodiment of the invention, the power pack may also be employed as a source of mechanical energy. In this arrangement, suitable remote or local switches may be provided to bypass the torque or speed switch in the unit, thereby permitting current from the batteries to flow into the generator. If a DC generator of the type having a permanent magnet is employed, it has been found that the generator may thus also serve as a motor for performing useful operations, especially since the gear train provides a large mechanical advantage. This type of motor is preferred since adjustment of brushes is not necessary in order to provide efficiently both generator and motor function. The crank of the power pack may thus be removable, to permit the shaft to be usefully employed, for example in various tools such as screwdrivers and mixers, as well as for other devices requiring mechanical actuation, for example, emergency indicators.

Since the assembly in accordance with the invention is dependent upon manual power for its operation, it is essential that all steps be taken to increase the efficiency of the apparatus. Thus when the load is a flashlight, the reflector for directing the light as a spot is preferably a parabolic reflector, and it is preferable that the reflector have a diameter as great as possible, preferably more than about 4 inches. Further, for the most efficient use of a light, the reflector or lens should have a ripple or diffuse finish, thereby spreading the light output evenly over the spot, rather than providing a spot having bright portions and dark portions as in most conventional flashlights. It has been found that, with this type of spot, the light energy is more effectively employed from the standpoint of the user. In other words, less light output is required when a diffuse reflector or lens is employed, to obtain a given visual effect, than when the reflector and lens has a smooth finish.

BRIEF DESCRIPTION OF THE DRAWINGS

The invention will now be more fully disclosed with reference to the accompanying drawings, in which:

FIG. 8 is a phantom view of the flashlight of FIG. 7, taken from the right hand side, to illustrate in greater detail the pull cord mechanism employed therein;

FIG. 9 is a simplified circuit diagram of a modification of a charging system in accordance with the invention, employing a heater for the batteries;

FIG. 10 is a circuit diagram of a modification of the circuit of FIG. 9;

FIG. 11 is a circuit diagram of a further modification of the circuit diagram of FIG. 9;

FIG. 12 is a side view of a battery wound with a spiral resistance tape, and provided with a thermostatic switch, for use in the arrangements of FIGS. 9 and 10;

DESCRIPTION OF THE PREFERRED EMBODIMENTS

Figure 1:
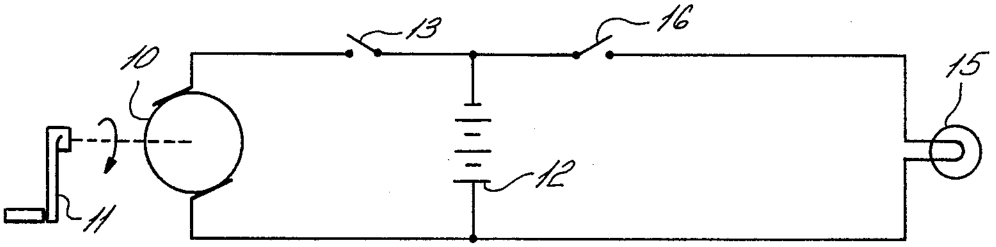
FIG. 1 is a circuit diagram of a power pack incorporated in a flashlight according to one embodiment of the invention.

Referring now to FIG. 1, therein is illustrated the circuit of a flashlight assembly according to one embodiment of the invention. The circuit is comprised of a generator 10 adapted to be mechanically driven, for example by means of a hand crank 11. The generator 10 will be discussed in greater detail in the following paragraphs. One or more rechargeable batteries 12, such as pressure vented nickel-cadmium batteries, are connected in series to the output of the generator 10 by way of a torque or speed switch 13 or the like. It is to be stressed that rectifying devices, such as diodes, could be used for this purpose, but additional power input is required in such devices due to their inherent voltage drops.

The batteries 12 may be directly connected to a conventional lamp 15 or other output device by way of a conventional switch 16.

As stated above, the selection of the generator 10, batteries 12 and gearing provided between the generator 10 and operating handle 11 are dependent at least in part upon the capabilities of an average individual to produce the desired results. The output device, such as lamp 15, must also be selected with regard to these considerations, with respect to current and voltage requirements, so as to enable use of the device for a reasonable length of time following the charging of the batteries. Further, as stated above, according to the known relationships of generators, the input torque requirement of a generator is a direct function of the output current, and the power output of a generator is a direct function of the speed with which its rotor is turned. It has been determined that, with low torque, i.e., torque resulting primarily from friction in gearing and windage, an average individual will be-able to turn a moderately large, e.g. 6 inch, crank at a speed of not greater than about 150 rpm and a small crank, e.g. 2 inch, not more than 250 rpm, and will tire of the task in about one minute. According to this invention, it has been determined that the components should be designed so that a maximum crank rotation speed of about 120 rpm should be available so that the user tires after about one minute of cranking in this way to achieve the changing characteristics discussed supra. Less duration and speed would be attainable while charging, because the current output of the generator produces additional torque. If the charging current, and thus the torque, is increased too much, fatigue will set in at an earlier time. The current produced, which is employed to charge the batteries, must of course exceed the current requirements of the load in order to enable operation of the load device without continuous charging. For this purpose, it has been found that the current output of the generator should be in the range of 5 to 20 times the rated ampere hour capacity of the battery. The spotlight lamp 15 or other output device is of course selected to provide a reasonable length of operating time, for example up to an hour, following each charging period for the batteries. In general, it is preferred that that ratio between the time of use and the time required for charging be at least 10 to 1, for practical flashlight use, whereas with a transistorized emergency flasher with minimal current requirements, the ratio is several hundred to one.

As an example of the design of a flashlight unit according to the invention, assume that it is desired to employ a flashlight bulb, such as the type No. PR 6, which operates with a current of 0.3 amperes at 2.47 volts. Since the nominal cell voltage of nickel-cadmium batteries is 1.2 volts, two such batteries would be employed, and for operation for about 15 minutes two pressure vented nickel-cadmium batteries of the sub C size, having rated capacities of about 1 ampere hour may be employed. In order to charge the batteries in a short time, for example with a charge current of about 6 times the ampere hour capacity, the generator must provide about 6.0 amperes at about 3 volts, i.e., a power of about 18 watts. Thus, a 30 second charge at 6 amperes is 3 ampere minutes. A typical load would be a PR-6 lamp drawing 0.3 amperes at 2.47 volts. Dividing 3 ampere minutes by 0.3 amperes gives 10 minutes of lamp operation, a ratio of 20:1. Since ampere hour efficiency of nickel-cadmium cells is about 97% at low states of charge, a practical ratio of 19.4:1 is attained. A generator is then selected which produces such a power output at a determined rotor speed, for example, 8,000–12,000 rpm, and the gearing between the rotor and the operating handle is selected to give the desired stepup of crank rotation speed from about 75 to 150, so that the gearing would have a ratio of about 80–120 to 1. In such a system, the torque at the handle, which is a sum of the system losses and a direct function of the current, is not too great for an average individual to place a reasonable charge on the batteries. If the torque were too great, the system would of course be redesigned, for example, by employing a different gear ratio or generator winding. Thus, since the torque is directly proportional to current, the torque may reasonably be decreased within limits by employing a decreased generator voltage with lower charging current, and increasing the number of series connected batteries, and the voltage output of the generator may be increased by increasing its rotational speed by means of a higher gear ratio. The load can then be selected in accordance with the battery capacity and terminal voltage. This example has been cited merely to show one technique that may be employed for selecting the components of a device according to the invention, and the interrelationships of the characteristics of the components, and is not intended to constitute the only values of components that may be employed. It does point out, however, the criteria with respect to dependence of the circuit design and selection of components of the system upon the expected charging ability of an individual, in order to obviate the necessity for complex controls in the charging circuit to avoid damage to the batteries, while still enabling relatively rapid charging of the cells. What typically are considered excessively high charge currents can be tolerated by certain nickel-cadmium batteries by the shortness of charging time (as determined by limited human effort) and the size of the individual cell would be adjusted so that the amount of charge would not exceed approximately 25% of the cell's rated capacity.

The generator 10, in order to provide an efficient apparatus in accordance with the invention, must employ high flux-density magnets, for practical size and portability. In addition, the resistance of the generator circuit must be minimized, and the generator must be impedance matched to the batteries. For efficient transfer of the energy, the generator should be designed to have an impedance equivalent to the total impedance of the battery combination employed. The open circuit voltage of the generator at the desired cranking speed must also be greater than the total cell charging voltage of the batteries employed in the apparatus. Thus, in accordance with the invention, the generator has a low voltage output, in order that its impedance match the impedance of the batteries, and it is apparent that increasing the voltage of the generator to any extent greater than necessary is not desirable due to decreased generator efficiency.

Specifically, it is desirable for the open circuit voltage of the generator to be about 33% greater than the voltage at the batteries. This results from the fact that the maximum power is derived from the generator if the voltage of the generator drops to 50% when the batteries are connected thereacross, but that the maximum efficiency results when the voltage of the generator drops to only 75% of its open circuit voltage, upon connection of the batteries thereto. Since the efficiency of operation must be maximum in a small hand-held manually operated flashlight, it is apparent that the preferable operation occurs when the open circuit voltage of the generator is about 33% greater than the battery voltage.

With reference again to the generator, as above discussed high flux density magnets must be employed and the magnets must therefore operate with concentrated flux and be of a small size. The magnets, for example ceramic magnets, preferably have a high degree of orientation.

In order to reduce losses in the generator, shunted brushes may be employed, and it is preferred that the brushes have a very high copper content. While it is known that high copper content brushes have a reduced life-time it has been found that this is not of any consequence with respect to a hand-held portable flashlight, since even high content copper brushes have an adequate lifetime for this type of device. Thus, the apparatus in accordance with the invention is designed to have a short duty cycle, for example 5 seconds of operation of the generator results in about 1.5 minutes of useable operation of the flashlight so that in fact the generator need not have a very long cumulative lifetime due to its short periods of operation.

In the generator, and throughout the remainder of the circuit, the electrical leads should be as short as possible, in order to reduce the circuit resistance to enable the most efficient operation of the system. It is preferred that all contacts in the generator, at the batteries, and in the circuit be welded, or soldered. Pressure contacts are not recommended. When all of these criteria have been satisfied, it has been found that the hand-held manually operated flashlight in accordance with the invention may be provided in a size no greater than that of a conventional flashlight having a 6 volt lantern battery. For example, for a two cell battery flashlight whose generator can produce 18 watts, or for a four cell flashlight whose generator can produce 36 watts, it has been found that a suitable generator may be provided having a diameter of only about $1\frac{1}{2}$ inches and a length of about $2\frac{1}{2}$ inches.

A typical embodiment of the invention will now be described with reference to FIGS. 2 and 3. In this embodiment of the invention, a generator 30 of the above described type and one or more serially connected pressure vented rechargeable nickel-cadmium batteries 31 are enclosed in a housing 32. A reflector enclosure 33 is mounted on the assembly for holding a reflector 34, for example in the conventional manner employed in flashlights. For example, a ring 35 may be threaded on the end of the enclosure 33, for holding a transparent member 36 and the reflector 34 in place. A lamp holder 37 is mounted at the center of the reflector, for holding a lamp 38. A switch 40 for the unit may be mounted in the reflector enclosure 33. The circuit is wired in the same manner as that illustrated in FIG. 1.

Figure 4:
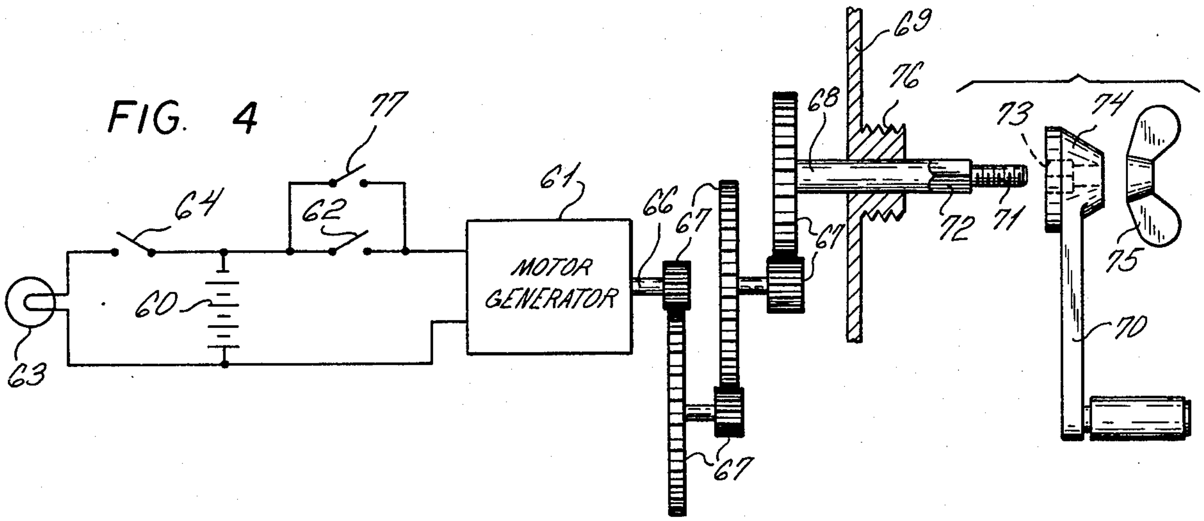
FIG. 4 is a schematic partially exploded illustration of another embodiment of the invention, incorporating means for providing a mechanical output.

A cranking handle 45 is provided extending from the housing 32, the shaft 46 of the cranking handle being coupled to the shaft 47 of the generator by way of a gear train of suitable gears 48. The gears 48, for example of brass or nylon, are mounted in suitable bearings (not shown). The gears provide the necessary ratio between the cranking handle and the shaft 47 of the generator. While three stages of gears are illustrated in FIG. 4, the invention is of course not limited to this number. It is preferred that each set of gears in the gear train have a ratio of no greater than about 8:1. In the design of the gears, it is to be noted that the gear connected to the shaft 46 establishes the spacing between the top of the housing and the shaft 46, and thus in order to make the crank 45 as long as possible, the size of the gear 48 may be reduced so that the crank is as close as possible to the top of the housing.

Figure 3:
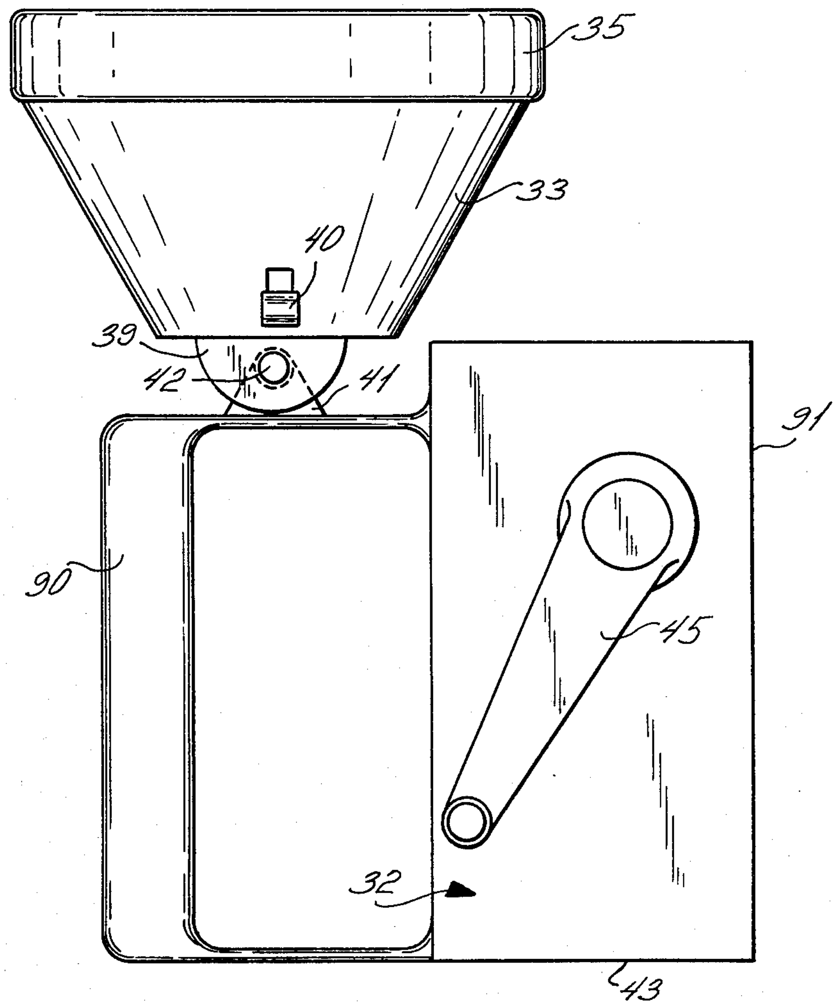
FIG. 3 is an end view of the flashlight arrangement of FIG. 2.

As further indicated in FIG. 3, the flashlight housing is provided with a handle 90. The handle is affixed by any suitable means, such as by screws, to the top of the housing. It is to be noted that the axis of the handle, i.e. the portion of the handle gripped in the fist of an individual, extends in a direction that is not parallel to the cranking axis of the crank 45. Preferably, the axis of the handle is normal to a plane defined by the cranking axis. This disposition of the handle has been found to provide the distinct advantage that it enables an individual to exert more energy in a more efficient manner, in charging the apparatus. Thus, if the axis of the handle were to extend parallel to the cranking axis, the user has difficulty in properly restraining the housing from movement with the crank, and hence additional energy must be employed to stabilize the unit. In the disposition of the handle as illustrated, however, the energy required on the part of the user in holding the housing during a cranking operation is minimized.

As is apparent in FIG. 3, the reflector enclosure 33 may be pivotedly mounted to the handle 90, for example by means of a flange 39 affixed to the enclosure 33, a flange 41 affixed to the handle 90, and a conventional pivot joint 42 for interconnecting these members. This arrangement enables adjustments of the direction of the beam of light by the operator, as desired.

Figure 2:
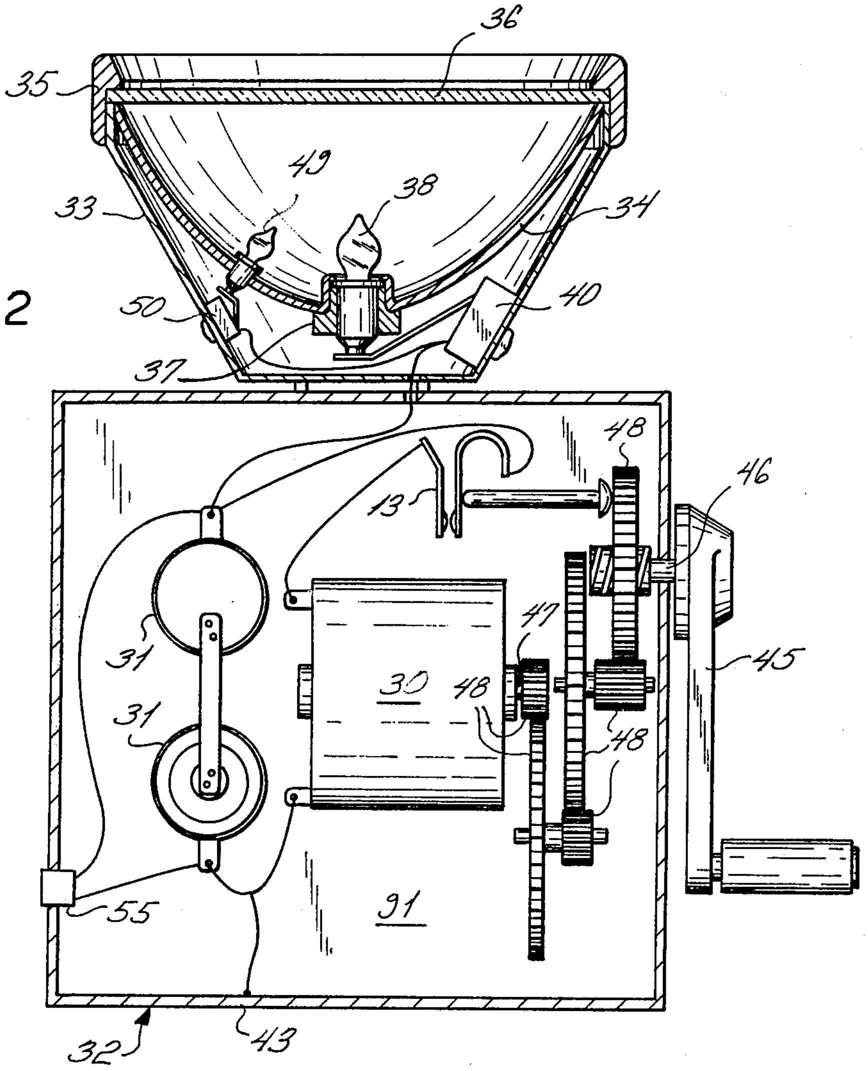
FIG. 2 is a partially cross sectional view of one embodiment of a flashlight according to the invention.

As illustrated in FIGS. 2 and 3, the housing also has a flat bottom 91, and a flat side 43 and the housing is designed to be as wide and low as possible for stability. This also eases the task of charging the unit. Thus, with a flat bottom, in many locations the user can place the unit on a flat surface to more firmly hold it during a cranking operation. When the unit is held in this manner, it has been found that the user can exert much greater energy in charging the unit, and hence place a greater charge on the batteries in a shorter period of time. The feature of a wide and low housing is desirable, since this also enhances the stability of the unit when it is being manually cranked, used or stored. This feature is especially adaptable in moving environments.

The device in accordance with the invention may alternatively, or in combination with the lamp 38, be provided with an emergency flasher lamp 49. For example, this lamp may be mounted on the reflector 34, and be interconnected with the batteries 31 by way of a switch 50 also mounted on the reflector enclosure. Emergency flashers of this type require very little current, and it has been found that a charging time to useful illumination time ratio of 750 to 1 may be obtained with such a flasher. For example, if the crank is turned for about 30 seconds to charge the batteries, about six useful hours of illumination time of the emergency flasher may be obtained.

The reflector 34 is of course preferably parabolic in shape, and in accordance with the invention it also has a diffuse surface, for example a hammer-tone or ripple finish. By this technique it has been found that the same visual effect can be provided with a lower energy, than with a reflector having a smooth finish. Thus, in the normal smooth reflector, the projected spot has areas of high intensity and areas of low intensity, and the user must either move the flashlight back and forth across a view, or he must provide adequate light output in the flashlight that all areas to be viewed are adequately illuminated. In accordance with the invention, however, by employing a diffuse or ripple reflector or lens, it has been found that the required light output for viewing is reduced. This is of particular advantage in a hand-held manually operated flashlight, since it reduces the size of components that must be employed to produce a given visual effect.

For the greatest efficiency, it has been found that the ratio of the diameter of the reflector to the bulb current must be at least about 8–1, in order to obtain the maximum benefit of the reflector, and also that the reflector must have a diameter of no smaller than about 4 inches, in order to provide the most efficient operation of the apparatus. For example, with a 4 inch diameter reflector, it has been found that a 500 milli ampere lamp is more suitable.

The components may be mounted within the housing 32 in any convenient manner. The housing 32 may also include additional auxiliary elements to enable the device to be employed for other purposes. For example, a receptacle illustrated generally by the numeral 55, may be mounted in the wall of the housing 32 and connected internally to the batteries, the receptacle being suitable for operation of external electrical devices, such as electric lighters, fire starters, radios, emergency transmitters, etc. In addition, while it is not necessary to the functioning of the device, as aforestated, and may indeed tend to inadvertent overcharging of the cells, it may also be convenient to employ an electric trickle charging circuit and/or provisions for a fast charge suitable for plugging the unit into a conventional power source for charging the batteries, to obviate the necessity of manual charging of the batteries where such a source is convenient. These extra arrangements are of course optional conveniences, and do not form a part of the invention itself.

In a further embodiment of the invention, as illustrated in FIG. 4, a plurality of rechargeable batteries 60 are serially connected to the output of a motor generator 61 by way of torque or speed switch 62, and the terminal voltage of the battery 60 is applied to a load such as lamp 63 by way of a switch 64. The shaft 66 of the motor generator is connected by way of a suitable gear train 67 to a shaft 68 which extends through the wall 69 of a suitable housing. This portion of the system of FIG. 4 may be arranged in the same manner as the system of FIG. 2. The wall 69 may thus be a wall of a housing of the type illustrated in FIGS. 2 and 3. In the arrangement of FIG. 4, the cranking handle 70 is readily removable from the external end of the shaft 68. For example, the end of the shaft 68 may have a threaded portion 71 and adjacent thereto a flattened portion 72, so that the aperture 73 in the hub 74 of the handle may engage the flattened portion 72, the aperture having a configuration similar to the flattened portion of the shaft, and a wing nut 75 may be threaded on the threaded portion 71 on the end of the shaft to hold the handle in place. It will be obvious, of course, that many other conventional arrangements may be employed for holding the handle 70 on the shaft. In addition, the wall 69 may be provided with a threaded boss 76 surrounding the shaft as it emerges from the wall, for the attachment of auxiliary devices. In the arrangement of FIG. 4, a switch 77 is also provided for bypassing the switch 62. The switch 77 may be a remote switch, for remote operation thereof, or it may be provided on the housing itself.

In the arrangement of FIG. 4, the DC motor generator 61 is of the type having a permanent magnet. When the switch 77 is closed, current from the batteries 60 flows through the windings of the motor generator, thereby causing the shaft 66, and hence the shaft 68 to turn. The shaft 68 may provide a useful mechanical output. For example, after the batteries 60 have been charged by cranking the handle 70, the handle 70 may be removed, and the switch 77 closed, so that the shaft 68 will turn.

Figure 5:
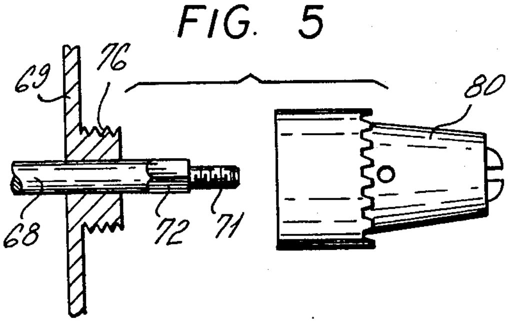
FIG. 5 is a partially exploded view of a portion of FIG. 4 illustrating one use of the arrangement of FIG. 4.
Figure 6:
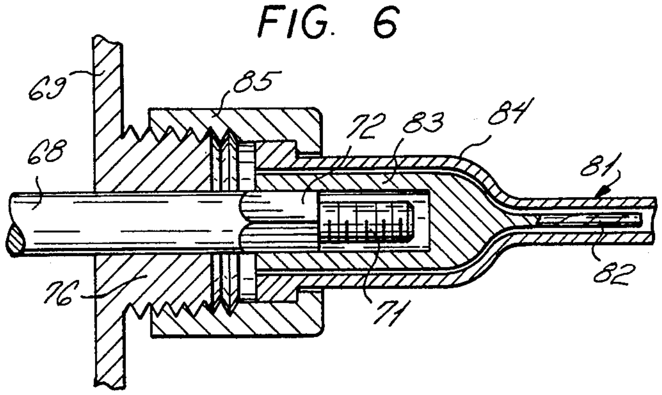
FIG. 6 is a cross sectional view of a portion of the device of FIG. 4 illustrating another use thereof.

As one example of a device which may be employed in combination with the system of FIG. 5, a conventional chuck 80 may be threaded to the end of the shaft 68 on the threaded portion 71. The chuck 80 may be employed in combination with drills or other rotary tools, as desired. In a further arrangement, as illustrated in FIG. 6, the mechanical output of the shaft 68 may be used by providing a Bowden cable 81 including an inner cable 82 connected by a coupling 83 to the flattened portion 72 of the shaft, the outer sheath 84 of the cable being held with respect to the walls 69 by means of a threaded collar 85 adapted to fit the threaded boss 76. The Bowden cable may be employed in any conventional manner, for example, for operating various tools, etc., which may be employed at locations having no conventional power sources.

Figure 7:
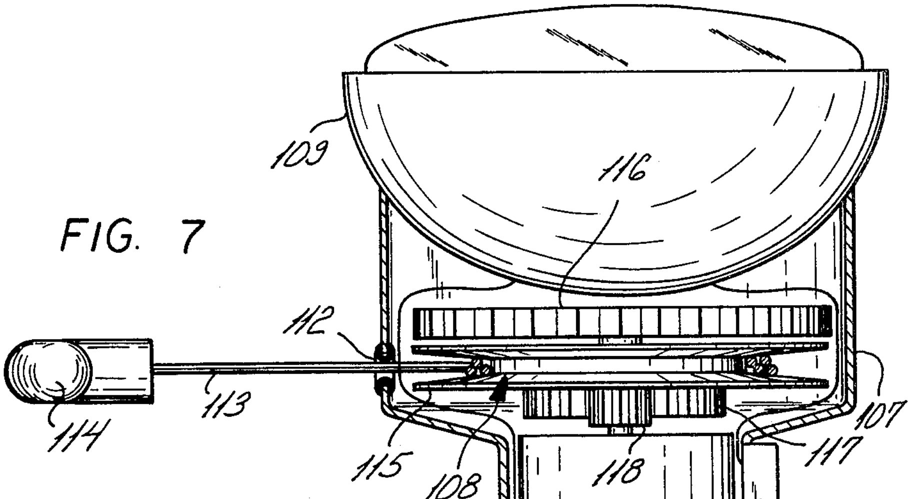
FIG. 7 is a partially cross sectional view of a flashlight in accordance with a further embodiment of the invention, illustrating the use of a pull cord for charging the batteries.
Figure 7:
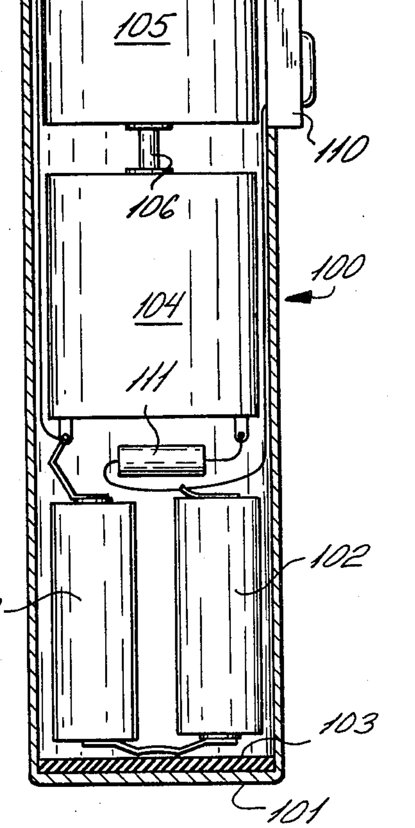

In a further embodiment of the invention, as illustrated in FIGS. 7 and 8, a pull cord may be employed for rotating a generator, as an alternative to the crank employed in the previously disclosed embodiments. For example, a cylindrical casing 100 having one closed end 101 may be provided, with the nickel-cadmium battiers 102 placed in the casing toward the end 101. An insert of insulation 103 may be provided to insulate the battery from the end of the casing. The generator 104 is centrally disposed within the casing 100, and the gear box

105, coupled to the generator 104 by a shaft 106, is mounted toward the open end of the casing.

The end 107 of the casing away from the closed end thereof has an enlarged diameter, and a pull cord assembly 108 is mounted therein for rotating the gears of the gear box. A suitable reflector 109 is mounted at the end of the casing 100, for holding the lamp (not shown). The switch 110 connected to the lamp may be mounted on the side of the casing 100. The arrangement of FIGS. 7 and 8 may be wired in the manner illustrated in FIG. 1, with a suitable speed switch (not shown).

The pull cord assembly is illustrated more clearly in FIG. 8, wherein the relative position of the case 100, reflector assembly 109, and enlarged portion 107 of the casing for holding the pull cord assembly are illustrated. Thus, the casing part 107 has an axis displaced from the axis of the rear casing portion 100, with one lower corner of this portion of the casing being formed generally square and having an aperture 112 through which the pull cord 113 extends. A pull handle 114 is provided at the external end of the cord 113. A drum 115 is rotatably mounted within the casing portion 107, and as illustrated in FIG. 7, the pull cord 113 is wrapped around the annular recess in the drum in conventional fashion. The gear assembly 116 of the pull cord assembly may be positioned toward the reflector 109, for driving a gear 117 coupled to a pinion 118 on the output shaft of the gear box 105.

In this arrangement, the axis of the cord passes through the center line of the casing 100 when fully retracted, i.e. at the start of the pulling operation, and is moved off-center when pulled, in order to minimize the torque in the grip of the case handle.

While the above disclosure has been directed to the use of pressure vented nickel-cadmium batteries in general for use in the assembly according to the invention, it is to be pointed out that the cells employed must have low resistances in order to accept the charge at the rate contemplated by the invention for providing a practical and useful device. The characteristic of low resistance is a function of cell construction and design and hence the cells that are employed in accordance with the invention must be low resistance design. In addition, it is preferred that the cells be of the sintered type, having welded connections. While internal electrodes and many vented nickel-cadmium cells have the low resistance characteristics that are necessary for an apparatus in accordance with the invention, vented wet cells are generally not suitable for portable apparatus such as flashlights, and the invention is therefore directed primarily to the use of pressure-vented cells which are completely portable. The adaptability of cells for use in the invention is apparently dependent upon the techniques employed in the manufacture of the cells, and it has been found that only certain types of available nickel-cadmium cells are suitable for a device in accordance with the invention. Thus, upon an analysis of available cells, it would not normally have been expected that nickel-cadmium cells would be suitable for a portable apparatus in accordance with the invention. As an example, it has been found that pressure vented nickel-cadmium cells identified as No. 41B903 AA105 (stock No. GCF250 Model ST), batteries identified as GCF 500 ST, and GCR1.0 ST manufactured by the General Electric Company, are suitable for use in the device in accordance with the invention. On the other hand, it has been found that cells identified as "GC1" "GC2" and "GE Perma-call" also manufactured by the General Electric Company are not adaptable for use in the invention since they will not accept a rapid enough charge to provide a useful device in accordance with the invention.

The characteristics of nickel-cadmium batteries and application data concerning such cell is discussed in "The Nickel-Cadmium Battery Application Engineering Handbook," Publication No. GET-3143, General Electric Company, 1971, edited by Robert L. Silzone, the content of which is incorporated herein by this reference.

As pointed out in the above publication, the charging characteristics of nickel-cadmium cells are affected by temperature, so that at low temperatures that normally be experienced in the use of a portable lamp, the cells will not accept a charge at a sufficient rate to provide a practical and useful assembly. In other words, the manual effort expended in operating the device does not result in the charging of the cells to such an extent that a useful device is produced. In order to overcome this problem in accordance with the invention, the cells in the apparatus may be wrapped with a resistance wire connected by way of a switch to the charging generator.

In one circuit of this form, as illustrated in FIG. 9, a resistance element 120 is wrapped around the battery cells and connected in series with a thermostatic switch 121. The resistance element 120 and switch 121 are connected in parallel with the generator 10. The thermostatic switch, which may be adjusted to close on a falling temperature of, for example, 30° to 35° F., is located in close proximity to the batteries. Thus, in this arrangement, in cold weather the thermostatic switch closes, allowing current flow through the heater 120, and thereby limiting charging current to the batteries by current diversion. Alternatively, the thermostatic switch 121 may include an additional contact which positively disconnects the batteries from the generator in cold weather. As a further alternative, a manual switch may be employed in place of the thermostatic switch 121, or a manual switch may be connected in parallel with the thermostatic switch to override thermostatic control. Thus, FIG. 10 illustrates a double throw thermostatic switch 122, having a first set of contacts which close on falling temperature to connect the heater across the generator, and a second set of contacts which close on rising temperature to connect the generator to the charging circuit. FIG. 11 illustrates an arrangement in which the thermostatic switch is not employed, but in which a manual switch 123 is provided, connected in series with the heater 120, so that the operation of the heater may be completely manually controlled.

By employing a heater for the batteries, in accordance with the invention, the cells may be charged at their acceptable rate at cold temperatures, while simultaneously heating the batteries to increase their charging capacity. Such battery heating, as described above, is not practical in a flashlight powered by conventional primary flashlight batteries or precharged secondary batteries, since the substantial energy required could not be replaced in the field. The expedient of heating the battery for cold temperature charging is generally necessary if the device in accordance with the invention is to be adapted for use in temperatures less than about 32° F.

FIG. 12 illustrates one manner, in accordance with the invention, in which a heating element may be employed for heating the nickel-cadmium battery. In this arrangement, a heating element 130 is spirally wrapped around the outside of a nickel-cadmium battery 131, and a thermostatic switch 132, such as the thermostatic switch employed in the embodiments of the invention illustrated in FIGS. 9 and 10, is affixed in intimate contact with the case of the battery. For example, a layer of silicone jelly 133 may be provided between the thermostatic switch and the battery to insure adequate thermal contact. The wire 130 may be in the form of a flat ribbon, for example of brass or a 30% conductive aluminum alloy of number 25AWG equivalent, thereby having approximately 100 ohms per thousand feet. The ribbon, in this case, may, for example, have cross sectional dimension of 0.125 inches by 0.002 inches.

Preferably, an anodized or thin high temperature cording or sleeve is provided under the heating wire, to provide electrical insulation between the wire and the battery at low voltages. The element 130 is spirally wound on the battery to provide the maximum contact area, and a minimum spacing is provided between the turns of the spirally wound element. The element 130 is preferably spring tempered coiled to have a diameter slightly less than that of the outside diameter of the battery, so that the battery may be inserted within the coil readily, while insuring good thermal contact between the battery and the wire. A thin insulation jacket (not illustrated) may also be provided over the spirally wound element, in order to direct as much of the heat developed in the resistance element to the battery as possible. The insulation jacket must, of course, be thin so that it does not undesirably interfere with the cooling of the battery in service. The heating element may also be premounted on a flexible substrate in the manner of printed circuit-flexible wiring.

As an example, a typical sub C nickel-cadmium battery has an outside diameter of 7/8 inches. If 10 turns of the element above described are spirally wound on such a battery, the element will have a length of about 27½ inches, and a resistance of about 0.2 ohms. With the generator 10 producing 5 amperes of current, about 5 watts will be dissipated in the heating of each battery. It has been found that this is adequate to warm a cell for the above stated purposes.

It is thus apparent that, in accordance with the invention, when nickel-cadmium batteries are employed, it is necessary that the cells be low gassing cells, and that the cells must be operated within a temperature range, of for example above 32° F., in order that their charging capacity is adequate.

While the invention has been particularly described with reference to the application of a conventional single acting crank, in some applications it may be of course desirable to employ a double crank, i.e., a crank which may be operated by both hands from opposite sides of the device. In this case, it has been found that the individual is capable and willing of expending more energy than with a single crank, and the design of the electrical components and the gear ratio may take into account the increased energy available. Alternatively, the arrangement according to the invention may also be operated by means of other forms of operating devices, such as wire pulls of the type conventionally employed to start small gasoline engines. If desired, the crank or other operating mechanism may be collapsible, to take a minimum space during storage or adjustable to allow a choice of operating torque.

Figure 13:
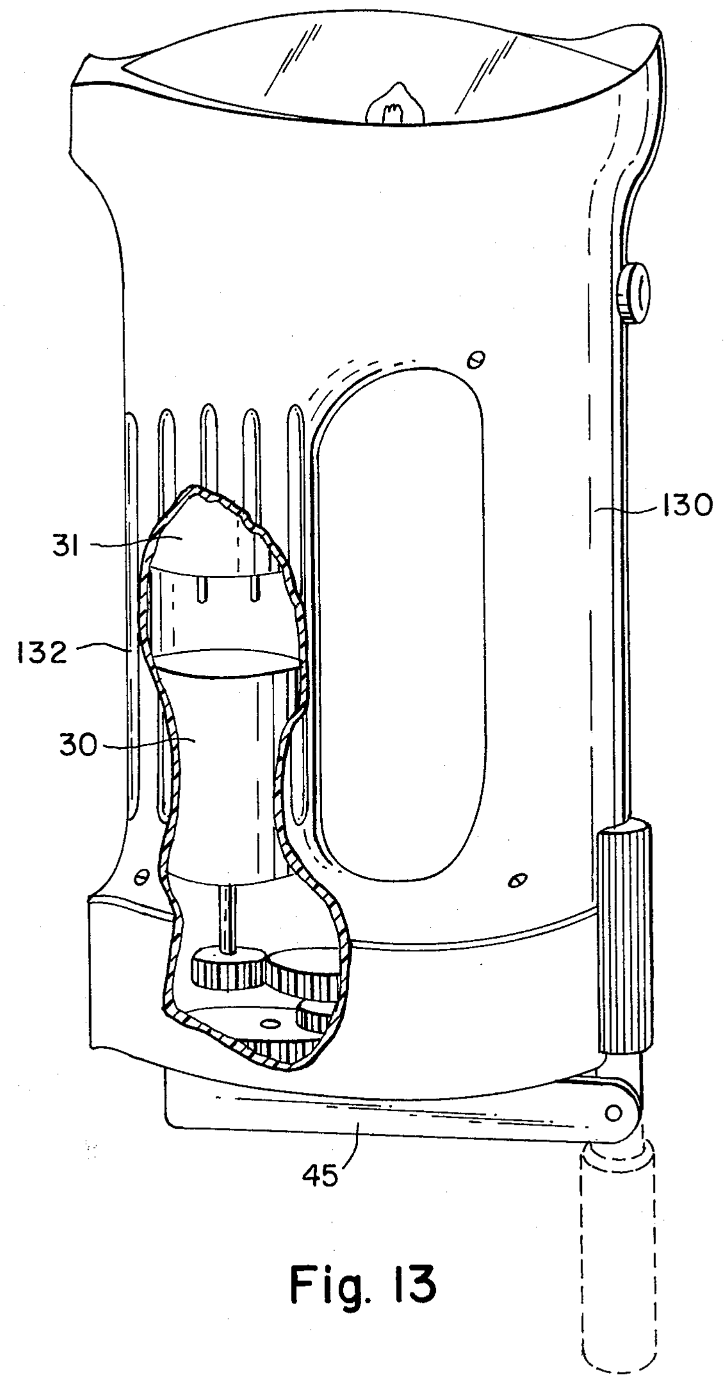
FIG. 13 is partly cut away pictorial illustration of a flashlight of this invention.

The flashlight of FIG. 13 has two hand grips 130, 132, extending parallel to each other and to the axis of rotation of crank 45. Grips are used for carrying the device and to hold the device upon a flat surface for cranking and the other grip, 132, is used to hold the device when no surface is available in which case the first mentioned hand grip 130 will sit against a crankers wrist to prevent turning of the flashlight in a simple non-taxing manner.

While the invention has been described with reference to only several embodiments, it will be apparent that many modifications and variations may be made therein within the teaching of this disclosure, and it is therefore intended to cover such obvious modifications and variations as fall within the true spirit and scope of the invention in the following claims.

We claim:

1. A portable electric device, comprising a. a generator including a rotatable operating shaft, b. crank means adapted to be actuated by an operator, c. gear means coupling said crank means to said shaft, d. rechargeable pressure vented nickel cadmium battery means, e. means connecting said generator to said battery means, f. an electric load device, g. means for connecting said electric load device to said battery means, h. the mechanical parameters of said generator, crank means, gear means, and the electrical parameters of said battery means being selected to preclude an operator from charging said battery means in a single continuous operation above a selected level substantially less than the total capacity of said battery means within a predetermined finite time period, and i. a casing containing said generator, gear means, and said battery menas, said crank being external to said casing, said casing including two spaced-apart hand grips extending parallel to the axis of rotation of said crank, one of said hand grips constituting means to be grasped by one hand of an operator so that the forearm of the operator is substantially perpendicular to said hand grip being grasped during cranking of said crank and the other of said hand grips positioned to butt against the wrist of the hand grasping said one hand grip, thereby to oppose torque generated during cranking.

2. A portable electric device comprising a generator including a rotatable operating shaft, crank means adapted to be rotated by an operator, gear means for coupling said crank means to said shaft, rechargeable battery means, means connecting said generator to said battery means whereby said battery means is charged by rotation of said crank means by said operator and said battery means regulates the voltage output of said generator, an electric output device, switch means for connecting said electric output device to said battery means, and a casing containing said generator, said gear means, and said rechargeable means, said crank means being arranged externally to said casing, said casing including two spaced-apart hand grip means extending substantially parallel to the axis of rotation of said crank means, one of said hand grip means including means to be grasped by one hand of the operator so that the forearm of the operator is substantially perpendicular to said hand grip means being grasped during cranking of said crank, whereby the other of said hand grip means is positioned to abut the wrist of the hand grasping said one hand grip means, thereby to oppose the torque generated during cranking.

* * * * *